(12) United States Patent
Fails et al.

(10) Patent No.: US 7,432,803 B2
(45) Date of Patent: Oct. 7, 2008

(54) WIRELESS CONTROL SYSTEM AND METHOD THEREOF

(75) Inventors: Gary Fails, Tappan, NY (US); Lauren E. Dunn, New York, NY (US); Paul Kleissler, Englewood, NJ (US)

(73) Assignee: City Theatrical Inc., Carlstadt, NJ (US)

( * ) Notice: Subject to any disclaimer, the term of this patent is extended or adjusted under 35 U.S.C. 154(b) by 220 days.

(21) Appl. No.: 11/109,013

(22) Filed: Apr. 18, 2005

(65) Prior Publication Data

US 2005/0286646 A1 Dec. 29, 2005

Related U.S. Application Data

(60) Provisional application No. 60/582,971, filed on Jun. 25, 2004.

(51) Int. Cl.
*G08B 1/00* (2006.01)
(52) U.S. Cl. ............... 340/531; 340/539.1; 340/539.11; 340/825.22
(58) Field of Classification Search ................. 340/531, 340/539.1, 539.11, 825.22; 362/233, 260; 315/312, 316
See application file for complete search history.

(56) References Cited

U.S. PATENT DOCUMENTS

| | | | | |
|---|---|---|---|---|
| 5,959,529 A * | 9/1999 | Kail, IV | ................. | 340/539.12 |
| 6,020,825 A * | 2/2000 | Chansky et al. | ........ | 340/825.22 |
| 6,031,455 A * | 2/2000 | Grube et al. | ........... | 340/539.26 |
| 6,331,756 B1 | 12/2001 | Belliveau | | |
| 6,424,096 B1 * | 7/2002 | Lowe et al. | ............. | 315/185 R |
| 6,459,217 B1 | 10/2002 | Vu | | |
| 6,570,348 B2 | 5/2003 | Vu | | |
| 6,664,745 B2 | 12/2003 | Vu | | |
| 6,697,415 B1 * | 2/2004 | Mahany | ...................... | 375/130 |
| 6,736,528 B2 | 5/2004 | Truong | | |
| 6,761,470 B2 * | 7/2004 | Sid | ........................... | 362/233 |
| 6,763,055 B1 | 7/2004 | Fry | | |
| 6,930,455 B2 * | 8/2005 | Chansky et al. | ............. | 315/315 |
| 7,211,968 B2 * | 5/2007 | Adamson et al. | ............ | 315/295 |
| 2002/0145394 A1 | 10/2002 | Sheng | | |
| 2003/0057887 A1 | 3/2003 | Vu | | |
| 2003/0222587 A1 | 12/2003 | Philogene | | |

OTHER PUBLICATIONS

"Blast Technology, ApS", *WDMX-512 User Manual*, (2003),35 pages.
"Interactive Technologies", *RadioDMX User's Manual*, (1997),43 pages.
"Interactive Technologies Product Information", *RadioDMX, Wireless DMX Distribution System*, (Nov. 2003),2.
Interactive Technologies, Radio DMX Wireless DMX Distribution System, Nov. 2003.
Martin, The Airborne DMX.
OEM Wireless Solution AB.

* cited by examiner

*Primary Examiner*—Daryl C Pope
(74) *Attorney, Agent, or Firm*—Maldjian & Fallon LLC; Jon Fallon, Esq.; John P. Maldjian, Esq.

(57) ABSTRACT

A wireless control system and a method for controlling devices (e.g., luminaires, dimmers, effects devices, stepper motors, and the like) used in entertainment lighting applications is disclosed. Embodiments disclose a modular transceiver utilizing a wireless broadcasting transmission technique and a wireless control system where an interface between a controller and controlled devices is facilitated using the transceivers.

21 Claims, 3 Drawing Sheets

WIRELESS CONTROL SYSTEM AND METHOD THEREOF

CROSS-REFERENCE TO RELATED APPLICATIONS

This application claims the benefit of U.S. provisional patent application Ser. No. 60/582,971, filed Jun. 25, 2004, the entirety of which is herein incorporated by reference.

BACKGROUND OF THE INVENTION

1. Field of the Invention

Embodiments of the present invention generally relate to entertainment lighting systems and, in particular, to methods and apparatus for controlling devices used in entertainment lighting applications.

2. Description of the Related Art

Lighting systems used in entertainment lighting applications (e.g., stage shows, sport events, public gatherings, theme parks, and the like) have become complex computer-controlled systems utilizing broad varieties of stationary and moving lighting and effects devices.

In conventional lighting systems, control cables are provided between a central post controller or one of subordinated controllers and individually controlled devices, such as luminaires, dimmers, stepper motors, fog/smoke generators, and the like. However, installation of the control cables is a difficult, expensive, and time-consuming procedure. In addition, the control cables limit the applications and use of lighting devices due to the restrictions in the location and length of the cables. Furthermore, the cables contaminate an operating space of a show and may constitute a personnel and public safety hazard.

Therefore, there is a need in the art for an improved method and system for controlling lighting and effects devices in the entertainment lighting applications.

SUMMARY OF THE INVENTION

Embodiments of the present invention are generally directed to a wireless control system and a method for controlling devices (e.g., stationary and moving luminaires, dimmers, stepper motors, effects devices, and the like) used in entertainment lighting applications.

In one embodiment of the present invention, there is provided a transceiver adapted for incorporation in controllers and controlled devices utilizing industry-standard wired control protocols (e.g., DMX512, RDM, or ACN protocol). The transceiver uses wireless broadcasting transmission techniques (e.g., IEEE 802.11 Ethernet Frequency Hopping Spread Spectrum (FHSS) and Direct Sequence Spread Spectrum (DSSS)) and facilitates a bidirectional wireless interface between a controller and controlled devices of a lighting system.

In another embodiment of the present invention, there is provided a wireless control system for operating a plurality of devices used in entertainment lighting applications. In the wireless control system, a controller and the controlled devices are provided with the inventive transceivers. In alternate embodiments, the system may include a remote controller and/or a remote monitor of transmitted and received data and commands.

In yet another embodiment of the present invention, there is provided a method for operating the inventive wireless control system. The method includes the steps of providing the controller and controlled devices with the transceivers, performing conversions of control and transmission protocols of transmitted and received signals, and using wireless technology to broadcast data and commands between the controller and controlled devices.

BRIEF DESCRIPTION OF THE DRAWINGS

So the manner in which the above recited features of embodiments of the present invention can be understood in detail, a more particular description of embodiments of the present invention, briefly summarized above, may be had by reference to embodiments, some of which are illustrated in the appended drawings. It is to be noted; however, the appended drawings illustrate only typical embodiments of the present invention and are therefore not to be considered limiting of its scope, for the present invention may include other effective embodiments.

To facilitate understanding, identical reference numerals have been used, where possible, to designate identical elements common to the figures.

DETAILED DESCRIPTION

Embodiments of the present invention are generally directed to a wireless control system and a method for operating lighting and effects devices used in entertainment lighting applications. Such applications may include, but are not limited to, theater, concert, museum, motion picture, television, sport event, public gathering, cruise ship, casino, amusement/theme park lighting applications, and the like.

In the context of the present invention, the terms "controlled devices" and "devices" are used interchangeably in reference to stationary and moving luminaires, dimmers, stepper motors, fog/smoke generators, and the like. Hereafter, similar apparatuses, devices and interfaces are identified using the same numeric references, except that suffixes may be added, when appropriate, to differentiate such apparatuses, devices, and interfaces.

Figure 1:
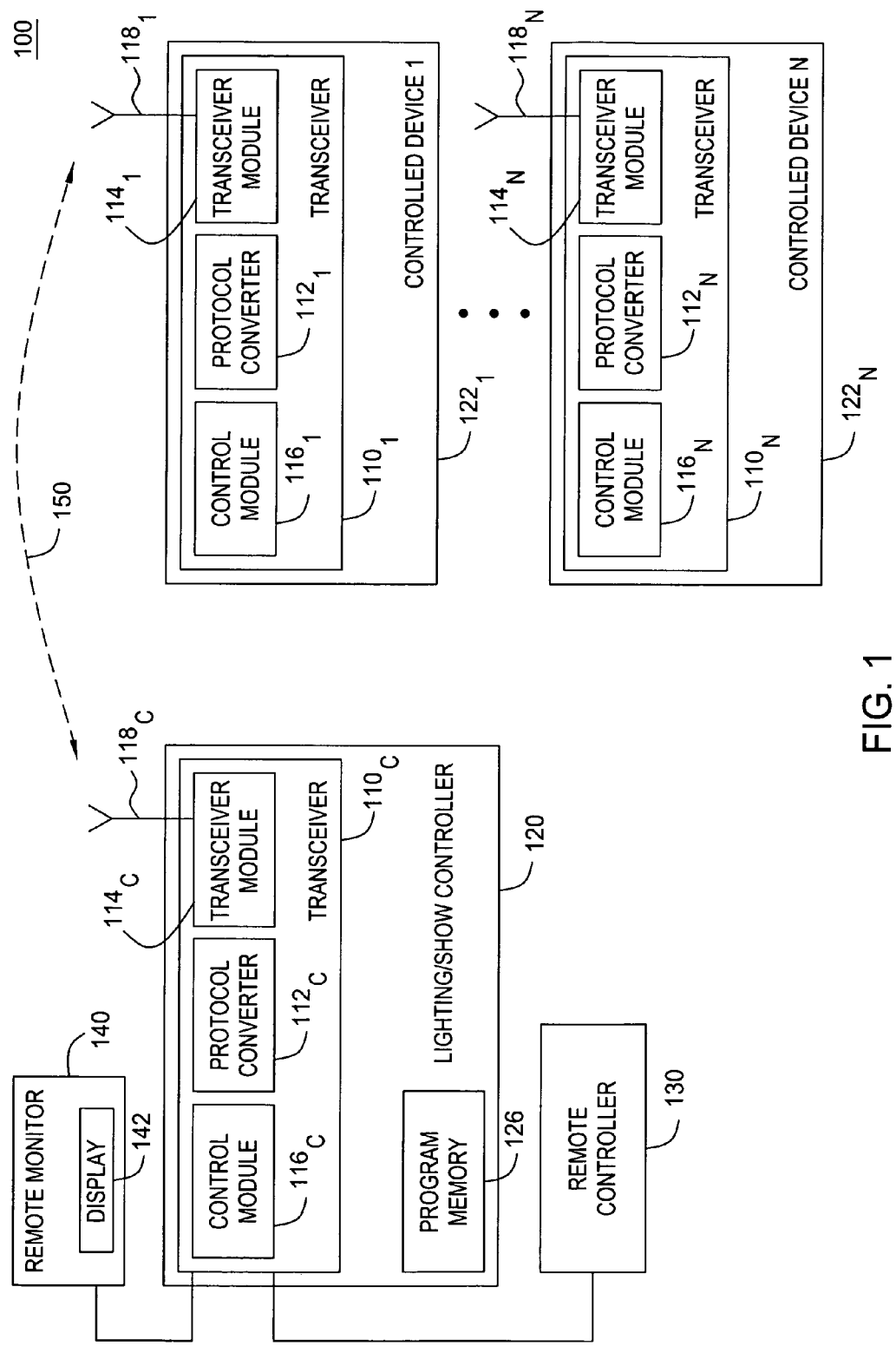
FIG. 1 is a high-level, schematic diagram depicting a wireless control system for entertainment lighting applications in accordance with one embodiment of the present invention.

FIG. 1 is a high-level, schematic diagram depicting a wireless control system 100 for entertainment lighting applications in accordance with one embodiment of the present invention. The system 100 generally comprises a lighting/show controller 120, a plurality of N controlled devices 122 where N is an integer and N ≧ 1, at least one optional remote controller 130 (one controller 130 is shown), and an optional remote monitor 140.

The controller 120 is generally a specialized or general-purpose computer executing a predefined or interactive program of operating the controlled devices 122 during a lighting application. Such a program may be stored in an internal program memory 126 of the controller 120 or a remote computer (not shown) coupled to the controller 120.

To operate the devices 122, the controller 120 produces corresponding instructions (i.e., data and/or commands) in a format of one of several industry-standard control protocols.

The devices 122 used in the lighting application with the controller 120 are compatible with at least one of such control protocols.

In one embodiment, the controller 120 and devices 122 use the DMX512 control protocol developed by the U.S. Institute for Theater Technology, Inc. (USITT) Engineering Commission and adopted by the Entertainment Services and Technology Association (ESTA). In other embodiments, the Remote Device Management (RDM) protocol or the Advanced Control Network (ACN) protocol, both developed by ESTA, may also be used by the controller 120 and/or devices 122. Each of such control protocols forms a wired communication link that includes a plurality of independent data/command channels (e.g., 512 or more channels), where each channel corresponds to a controlled parameter of the device 122 (e.g., setting of a dimmer, position of a stepper motor, and the like).

Generally, the device 122 may have a plurality of controlled parameters and be operated using a corresponding number of the data/command channels. In a further embodiment, the device 122 may comprise an optional binary coded decimal (BCD) switch 144 for on-site setting an address of the device (e.g., DMX512 address) and an optional built-in AC/DC (e.g., 100-240VAC/24VDC) power supply 146 (both shown using broken lines), as well as an optional pass-through connector (not shown) for a wired communication link to controlled devices without wireless capabilities.

In the system 100, the controller 120 and each of the controlled devices 122 comprises a transceiver 110. The transceivers 110 may be used in the existing controllers and lighting/effects devices having wired control interfaces, as shown in FIG. 1. In the depicted embodiment, the transceivers and components thereof of the controller 120 and devices 122 are identified using alphabetic ("C") and numeric (1 through N) suffixes, respectively.

Together, the transceivers 110 facilitate a bidirectional wireless interface 150 (i.e., radio-frequency (RF) interface) between the controller 120 and devices 122. In operation, the interface 150 propagates data and commands from the controller 120 to the devices 122, as well as propagates feedback/status data from the devices 122 to the controller 120.

In one embodiment, the transceiver 110 generally comprises a protocol converter 112, a transceiver module 114 having a transmitting/receiving antenna 118, and a control module 116. Communications between the host apparatus and the transceiver 110 are performed using an industry-standard control protocol supported by the respective host apparatus (e.g., DMX512 control protocol).

In the depicted embodiment, the transceiver 110 is a modular unit that may be incorporated in the controller 110 and devices 122 in a form of electronic hardware, e.g., printed circuit board (PCB), plug-in module, and the like. In an alternate embodiment, at least a portion of the transceiver 110 may be in a form of software, executed by processors (not shown) of the controller 120 and devices 122. In yet another embodiment, the transceiver 110 or a portion thereof may be an integral part of a host apparatus (i.e., controller 110 or device 122).

In the controller 120, a means of a wired control interface inputs the transceiver 110 with data and commands directed to the devices 122, as well as outputs from the transceiver feedback/status data received, via the wireless interface 150, from the devices 122. Correspondingly, in the devices 122, the data and commands received, via the wireless interface 150, by the transceiver 110 from the controller 120 are outputted to the means of the wired control interface, which is also used for inputting the transceiver with the feedback/status data requested by the controller.

The protocol converter 112 converts the industry-standard control protocol of the inputted data and commands in a format of a transmission protocol (e.g., the RS-485 protocol, and the like) compatible with the wireless broadcasting technology utilized in the transceiver 110. Accordingly, the protocol converter 112 converts data and/or commands received, via the wireless interface 150, by the transceiver 110 in a format of an industry-standard control protocol (e.g., DMX512 protocol) used by the host apparatus of the transceiver 110.

The transceiver module 114 uses the wireless broadcasting technology (i.e., RF technology) to establish the bidirectional wireless interface 150 between the controller 120 and devices 122. In operation, the transceiver module 114 broadcasts the data and commands converted using the protocol converter 112, as well as forwards to the converter 112 the received data and commands.

In one embodiment, the transceiver module 114 operates at one of a plurality of radio channels (e.g., 32 or more channels) at about 2.4 GHz using the Frequency Hopping Spread Spectrum (FHSS) or Spread Spectrum Frequency Channel Hopping Radio (SSFCHR) technology. FHSS is also known as Frequency Hopping Code Division Multiple Access (FH-CDMA). In lighting applications, the SSFCHR technology provides high electromagnetic immunity (EMI), high signal-to-noise ratios (SNR), and high reliability of the wireless interface 150. Alternatively, other wireless technologies can be used such as IEEE 802.11 Ethernet Direct Sequence Spread Spectrum (DSSS). DSSS is also known as Direct Sequence Code Division Multiple Access (DS-CDMA).

The control module 116 is generally an electronic circuit (e.g., integrated electronic circuit, or IC), a set of programming instructions, or a combination thereof administering operation of the transceiver 110. Among other functions, the control module 116 may select radio channels used by the transceiver module 114, provide the transceiver's status and diagnostic information, and the like.

The remote controller 130 is a lighting/show controller that, in operation, can substitute and/or override the controller 120. Generally, the remote controller 130 is a portable or handheld computer adapted for in-situ operation by service personnel installing and/or operating the devices 122.

In one embodiment, the remote controller 130 uses the DMX512, RDM, or ACN protocol and is coupled to the transceiver $110_c$ using the respective wired interface. In an alternate embodiment (not shown), the remote controller 130 may also be coupled to the transceivers 110 of the devices 122, e.g., to perform on-site testing of the devices.

The remote monitor 140 is a portable or handheld computer also operated by the service personnel (illustratively shown coupled to the transceiver $110_C$ of the controller 120). The remote monitor 140 and transceivers 110 may be coupled using, e.g., a Universal Serial Bus (USB) cable. In operation, the remote monitor 140 may be used to analyze, in real time, communication links between the controllers 120 or 130 and devices 122, as well as program and/or configure the controllers and respective transceivers (e.g., assign/modify operating instructions, device addresses, radio channels, channel power, and the like).

In one embodiment, the remote monitor 140 includes a display 142 (e.g., liquid crystal display (LCD), and the like) presenting, in a visual format, status the wireless communication link. In a further embodiment, the remote monitor 140 may be combined with the remote controller 130 to form a single apparatus.

In one embodiment, the transceiver 110 is fabricated on a multi-layer PCB having dimensions of about 1.95"(W)×

2.65"(L)×0.5"(H) and provided with a plug-in connector facilitating connectivity with the controllers and devices designed for using the DMX512 control protocol. The transceiver utilizes the SSFCHR technology at about 2.4 GHz, operates using 32 radio channels, and supports up to 400'/1500' long indoor/outdoor wireless communication links. Alternative means of wireless transmission, as mentioned herein, may also be used.

Figure 2:
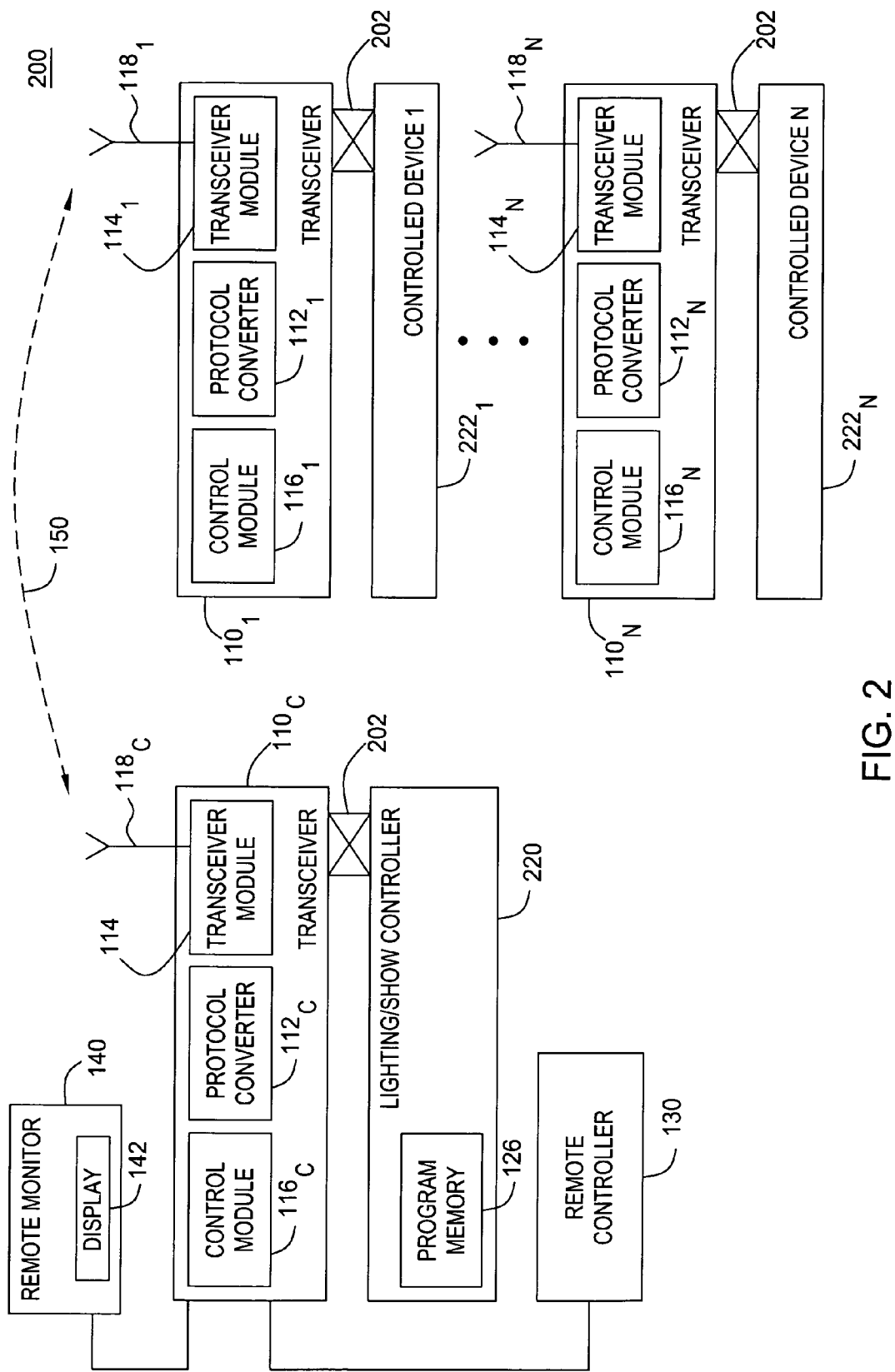
FIG. 2 is a high-level, schematic diagram depicting a wireless control system for entertainment lighting applications in accordance with another embodiment of the present invention.

FIG. 2 is a high-level schematic diagram depicting a wireless control system 200 for entertainment lighting applications in accordance with another embodiment of the present invention. The system 200 generally comprises a lighting/show controller 220, a plurality of the N controlled devices 222, a plurality of the (N+1) transceivers 110, at least one optional remote controller 130 (one controller 130 is shown), and the optional remote monitor 140.

In this embodiment, the transceiver 110 is generally a stand-alone apparatus (e.g., PCB) having a protective enclosure and a means of connectivity to the controller 220 and devices 222. In the depicted embodiment, such connectivity is provided using a cableless coupling 202 (e.g., connector-to-connector coupling).

The coupling 202 is adapted for transmitting data and commands in a format of the industry-standard control protocol (e.g., DMX512 protocol) used by the controller 220 and devices 222. In an alternate embodiment (not shown), the coupling 202 may be replaced with a short cable (not shown) connecting the transceiver 110 to the controller 220 or device 222.

Figure 3:
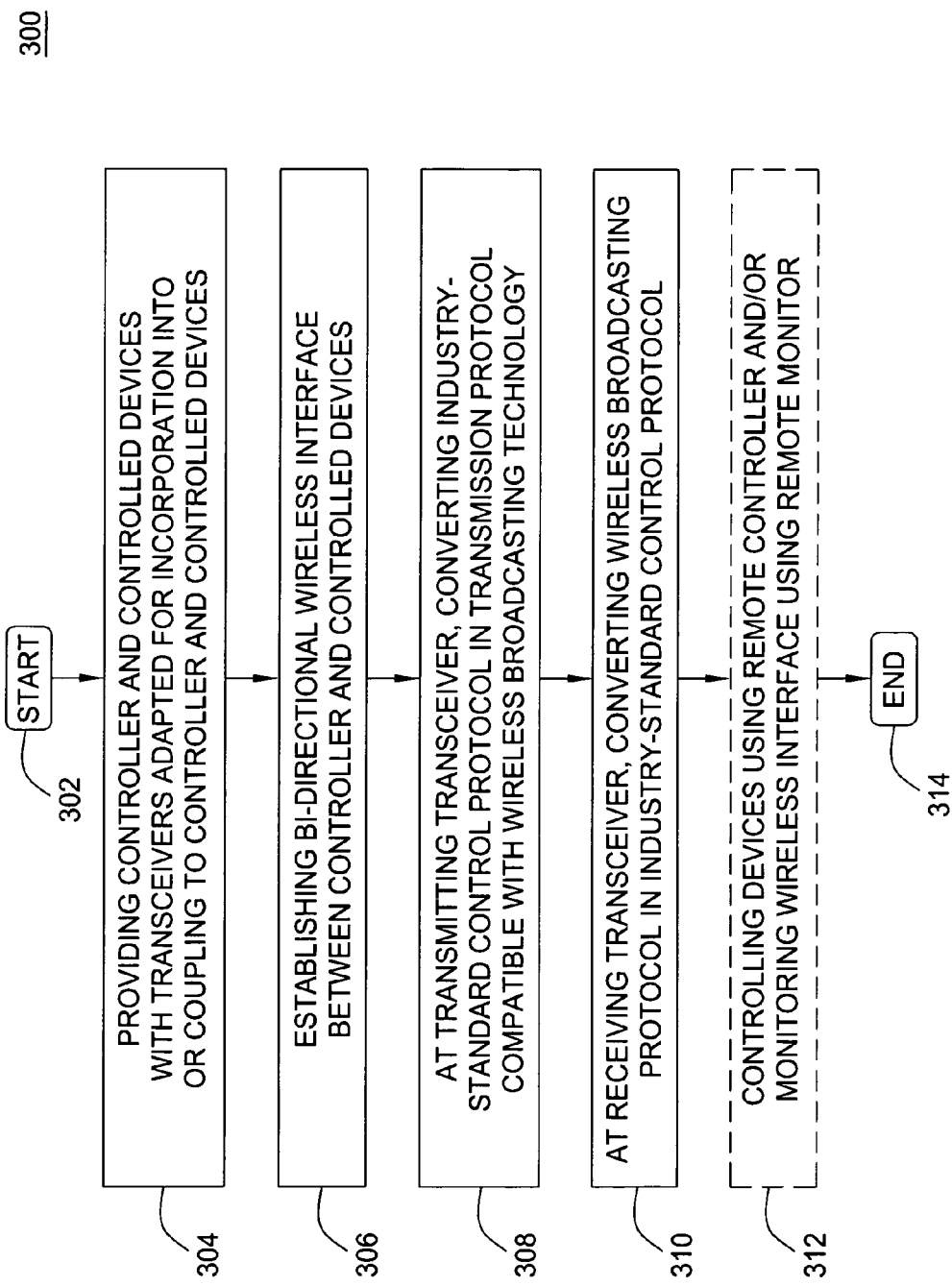
FIG. 3 is a flow diagram of a method for using the wireless control system of FIGS. 1-2 in accordance with an embodiment of the present invention.

FIG. 3 is a flow diagram of a method 300 for using the wireless control systems of FIGS. 1-2 in accordance with an embodiment of the present invention. The method 300 illustratively includes the processing steps performed in the system 100 (FIG. 1) and system 200 (FIG. 2) to control the devices 122 and 222, respectively. To best understand the present invention, the reader should simultaneously refer to FIGS. 1-2 and 3.

The method 300 starts at step 302 and proceeds to step 304. At step 304, the controllers 120, 220 and respective controlled devices 122, 222 are provided with the transceivers 110. In the system 100, the transceiver 110 is an internal component of the respective host apparatus (i.e., controller 120 or device 122). Correspondingly, in the system 200, the stand-alone transceivers 110 are coupled to the controller 220 and devices 222 using the means of external connectivity, such as connector-to-connector couplings, short cables, and the like.

At step 306, the transceivers 110 establish the bidirectional wireless interface 150 between the controllers 120 and 220 and controlled devices 122 and 222, respectively. In one embodiment, the transceivers 110 operate, using the SSFCHR technology, at one of a plurality of radio channels at about 2.4 GHz. Alternatively, other wireless transmission technology, as mentioned herein, may be used.

At step 308, a protocol converter 112 of a transmitting transceiver converts the industry-standard control protocol of the inputted data and commands (transceiver $110_c$ of the controller 120 or 220) or inputted data and commands (transceiver of the device 122 or 222) in a format of a transmission protocol (e.g., RS-485 protocol) compatible with wireless broadcasting technology, such as the SSFCHR transmission technique or alternative transmission techniques mentioned herein. Then, the data and commands being converted in the technique of the transmission protocol are broadcasted by the respective transceivers.

At step 310, a protocol converter 112 of a receiving transceiver converts the received data and commands (transceiver of the device 122 or 222) or received data (transceiver $110_c$ of the controller 120 or 220) in the industry-standard control protocol (e.g., DMX512 protocol) used by the host apparatus. The converted data and/or commands are forwarded to the host apparatus of the transceiver 110.

At optional step 312, the devices 122 (system 100) or 222 (system 200) are controlled by the service personnel using the remote controller 130 and/or the bi-directional wireless interface 150 is analyzed/configured by the service personnel using the remote monitor 140. At step 314, upon termination of the lighting application, the method 300 ends.

While the foregoing is directed to embodiments of the present invention, other and further embodiments of the present invention may be devised without departing from the basic scope thereof, and the scope thereof is determined by the claims that follow.

The invention claimed is:

1. A wireless transceiver, comprising:
  a means for coupling to a source of data or commands formatted using an industry-standard control protocol selected from a group consisting of the DMX512 protocol, the Remote Device Management (RDM) protocol, and the Advanced Control Network (ACN) protocol;
  a transceiver module using a wireless broadcasting transmission technique for facilitating a bi-directional wireless interface between the wireless transceiver and controlled devices of an entertainment lighting system;
  a protocol converter configured to convert the industry-standard protocol of inputted data or commands in a transmission protocol compatible with the wireless broadcasting transmission technique and to convert the transmission protocol of received data or commands in the industry-standard protocol; and
  a control module administering the converter and the transceiver module.

2. The transceiver of claim 1 wherein the transmission protocol is the RS-485 protocol.

3. The transceiver of claim 1 wherein the wireless broadcasting transmission technique is Spread Spectrum Frequency Channel Hopping Radio technology and the transceiver selectively uses at least one radio channel at about 2.4 GHz.

4. The transceiver of claim 1 further comprising a means of coupling to a remote monitor of transmitted and received data or commands.

5. The transceiver of claim 1 wherein the transceiver is a portion of or coupled to at least one of:
  a controller operating a plurality of devices; and
  each device of the plurality of devices.

6. The transceiver of claim 5 wherein the transceiver is incorporated in the controller and each device of the plurality of devices in a form of a printed circuit board (PCB) or a plug-in unit.

7. The transceiver of claim 5 wherein devices of the plurality of devices are selected from the group consisting of luminaries, dimmers, effects devices, and stepper motors.

8. The transceiver of claim 5 wherein a device of the plurality of devices further comprises at least a binary coded decimal (BCD) switch for setting an address of the device.

9. A wireless control system, comprising:
  a controller using an industry-standard control protocol selected from the group consisting of the DMX512 protocol, the Remote Device Management (RDM) protocol, and the Advanced Control Network (ACN) protocol; and a plurality of devices controlled using the industry-standard control protocol, wherein the controller and each device of the plurality of devices is coupled to or incorporates a transceiver;

wherein the transceiver comprises:
- a means for coupling to a source of data or commands formatted using an industry-standard control protocol selected from a group consisting of the DMX512 protocol, the Remote Device Management (RDM) protocol, and the Advanced Control Network (ACN) protocol;
- a transceiver module using a wireless broadcasting transmission technique for facilitating a bi-directional wireless interface between the transceiver and controlled devices of a lighting system;
- a protocol converter configured to convert the industry-standard protocol of inputted data or commands in a transmission protocol compatible with the wireless broadcasting transmission technique and converts the transmission protocol of received data or commands in the industry-standard protocol; and
- a control module configured to direct the operation of the converter and the transceiver module.

10. The system of claim 9 wherein the transceivers are adapted to communicate to one another selectively using at least one radio channel at about 2.4 GHz and Spread Spectrum Frequency Channel Hopping Radio transmission technique.

11. The system of claim 9 further comprising at least one of:
- a remote controller using at least one of the DMX512 protocol, the RDM protocol, and the ACN protocol; and
- a remote monitor of broadcasted data or commands, the monitor having a visual display.

12. The system of claim 11 wherein the remote controller and the remote monitor are combined together to form a single apparatus.

13. The system of claim 9 wherein the devices are selected from the group consisting of luminaries, dimmers, effects devices, and stepper motors.

14. The system of claim 9 wherein a device of the plurality of devices further comprises at least a binary coded decimal (BCD) switch for setting an address of the device.

15. A method of operating a plurality of devices controlled using an industry-standard control protocol, comprising:

providing a controller using the industry-standard control protocol;

providing the controller and the devices with a transceiver comprising:
- a means for coupling to a source of data or commands formatted using an industry-standard control protocol selected from a group consisting of the DMX512 protocol, the Remote Device Management (RDM) protocol, and the Advanced Control Network (ACN) protocol;
- a transceiver module using a wireless broadcasting transmission technique for facilitating a bi-directional wireless interface between the transceiver and controlled devices of a lighting system;
- a protocol converter, the converter configured to convert the industry-standard protocol of inputted data or commands in a transmission protocol compatible with the wireless broadcasting transmission technique and converts the transmission protocol of received data or commands in the industry-standard protocol; and
- a control module configured to direct the operation of the converter and the transceiver module;

converting the industry-standard control protocol of data or commands to be broadcasted in a transmission protocol compatible with a wireless broadcasting transmission technique;

converting the transmission protocol of received data or commands in the industry-standard control protocol selected from the group consisting of the DMX512 protocol, the Remote Device Management (RDM) protocol, and the Advanced Control Network (ACN) protocol; and broadcasting the data or commands between the controller and the devices using the wireless broadcasting transmission technique.

16. The method of claim 15 further comprising:
controlling the devices using at least one remote controller using the DMX512 protocol, the RDM protocol, or the ACN protocol.

17. The method of claim 15 wherein the transmission protocol is the RS-485 protocol.

18. The method of claim 15 further comprising:
monitoring the broadcasted data or commands using a remote monitor having a visual display.

19. The method of claim 15 further comprising:
broadcasting the data or commands using at least one radio channel at about 2.4 GHz and using Spread Spectrum Frequency Channel Hopping Radio transmission technique.

20. The method of claim 15 wherein the devices are selected from the group consisting of luminaries, dimmers, effects devices, and stepper motors.

21. The method of claim 15 wherein the wireless broadcasting transmission technique is Direct Sequence Spread Spectrum technology.

* * * * *